May 12, 1970  H. NERWIN  3,511,158

INTERVAL START FOCAL PLANE SHUTTER

Original Filed Feb. 1, 1967  4 Sheets-Sheet 1

HUBERT NERWIN
INVENTOR.

BY *Malcolm J. Dunn*
*Robert W. Hampton*
ATTORNEYS

May 12, 1970
H. NERWIN
3,511,158
INTERVAL START FOCAL PLANE SHUTTER
Original Filed Feb. 1, 1967
4 Sheets-Sheet 2
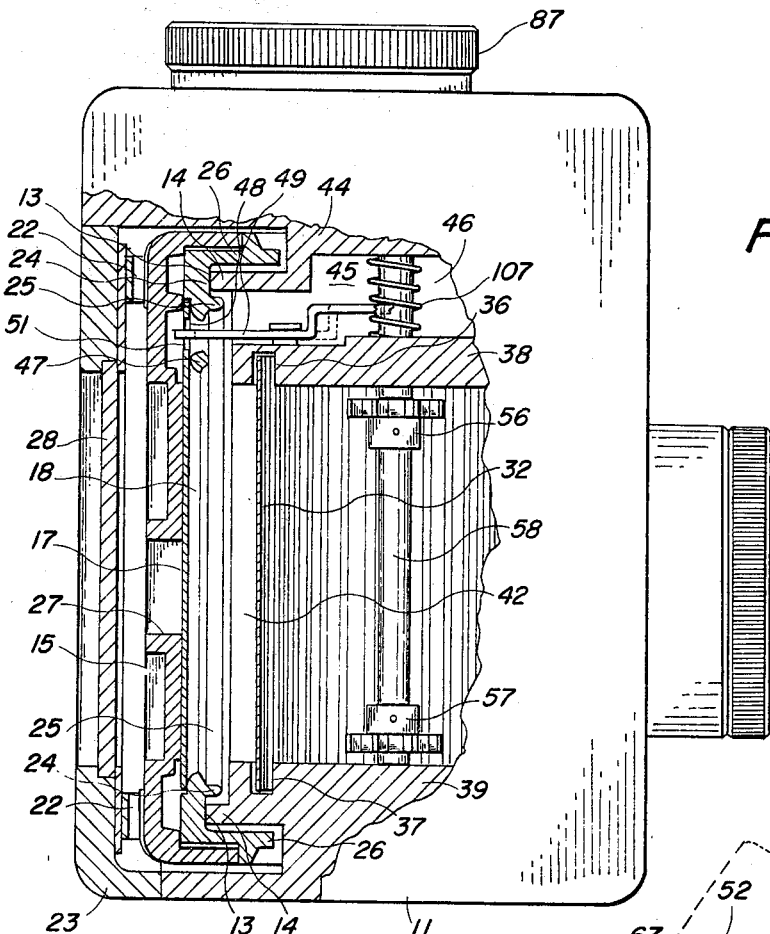
FIG.2
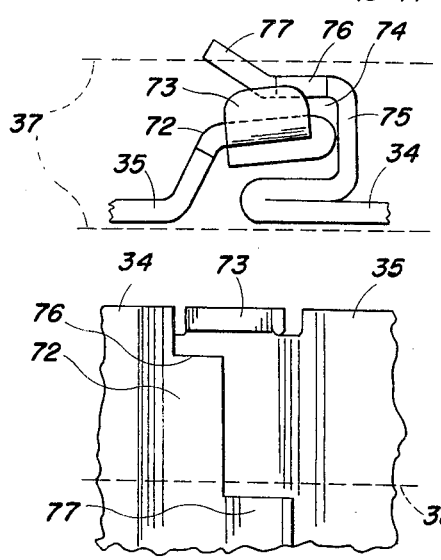
FIG.4
FIG.5
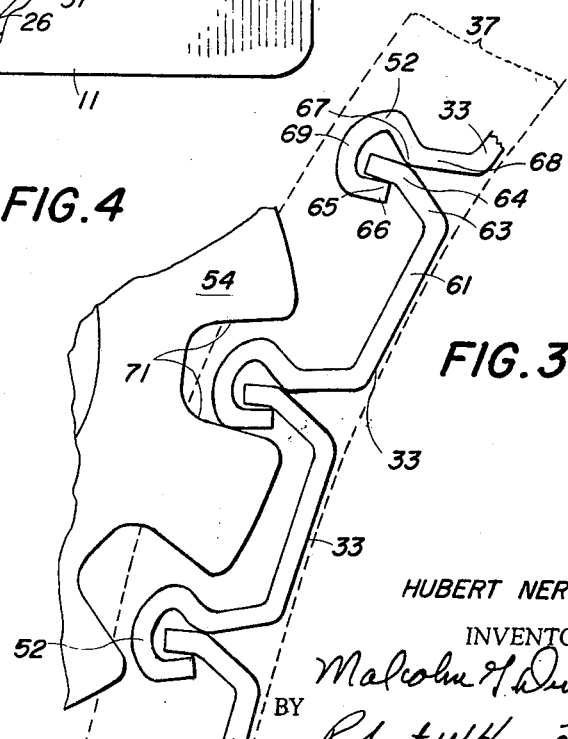
FIG.3
HUBERT NERWIN
INVENTOR.
BY Malcolm H. Dunn
Robert W. Hampton
ATTORNEYS May 12, 1970  H. NERWIN  3,511,158

INTERVAL START FOCAL PLANE SHUTTER

Original Filed Feb. 1, 1967  4 Sheets-Sheet 3

HUBERT NERWIN
INVENTOR.

BY Malcolm H. Dunn
Robert W. Hampton
ATTORNEYS

United States Patent Office 3,511,158
Patented May 12, 1970

3,511,158
INTERVAL START FOCAL PLANE SHUTTER
Hubert Nerwin, Rochester, N.Y., assignor to Eastman
 Kodak Company, Rochester, N.Y., a corporation of
 New Jersey
Continuation of application Ser. No. 613,317, Feb. 1,
 1967. This application Dec. 23, 1968, Ser. No. 800,310
Int. Cl. G03b 9/28
U.S. Cl. 95—57                             11 Claims

ABSTRACT OF THE DISCLOSURE

In a compact camera, such as a double spool magazine type, an improved interval start focal plane shutter of interlocking link members, and the method of assembling such interlocking link members to form two articulated curtains. The path of travel of the curtains is parallel to the film over the central part of the exposure frame, but the path curves toward the camera objective within the outer limits of the exposure frame to clear the chambers of the magazine and then reverses and curves around the chambers. The driving gears engage the curtains at a tangent near the points of curve reversion, i.e. near the points of inflection of the path.

This is a continuation of application Ser. No. 613,317, filed Feb. 1, 1967.

The present invention relates generally to photographic cameras and more particularly to focal plane camera shutters. Still more specifically, the invention relates to focal plane shutters particularly suited for use in compact cameras, especially those designed to employ a unitary pre-loaded film magazine.

Focal plane shutters have been well-known for many years and offer a number of advantages over other types of shutters by providing extremely fast exposure times, by enabling the objective lens to be employed to focus the camera and by simplifying the interchangeability of objective lenses. Although such shutters are employed in many relatively small cameras, space requirements have dictated that such cameras be designed with relatively wide spacing of the film supply and take-up chambers if the shutter components are to be accommodated between the chambers, adjacent the film exposure area. To reduce the size of such cameras, it has been proposed to provide a focal plane shutter comprising a pair of flexible curtains which are slidably guided in tandem relation by opposed channels to move in a common path, which runs parallel to the focal plane at the exposure area in tangential relation to curtain driving gears or sprockets, engaging the forward surface of the curtains at either side of the exposure area, with the end portions of the path curving at the areas of engagement with the gears and then in a reverse direction about the film chambers. In such a construction, the curtain driving gears are rotated sequentially to provide a predetermined time interval between the movement of the leading curtain and that of the trailing curtain, thereby regulating the width of the slit between the curtains to establish the effective duration of the film exposure. However, such an arrangement of the curtatin path still requires a prohibitively large space if such a shutter is to be employed in a camera in which the chamebrs are in close lateraly proximity to the exposure area. More particularly, in a camera designed for use with a pre-existing film magzine, such as the size 126 pre-loaded magazine disclosed in U.S. Pat. No. 3,128,081, which issued on June 23, 1964, the space limitations dictated by the close adjacency of the magazine film chambers to the exposure area do not allow driving gears to be located at the ends of a straight central portion of the curtain path extending across the exposure area, bearing in mind that the curtain cannot effectively accommodate abrupt changes in direction. Accordingly, the present invention relates to focal plane shutters of this same general type, but employing a different arrangement of the curtain driving gears and the curtain path in order to realize the primary object of the invention, which is to enable such shutters to be incorporated in compact cameras, especially those employing film magazines, in which space limitations obviate the use of prior shutters of the focal plane type.

The shutter curtains employed in focal plane shutters of this general type must be sufficiently strong and rigid to withstand the inertial forces to which they are subjected while supported only at their edges, yet must be light, freely flexible and light-tight. Therefore, another object of the invention is to improve the construction of flexible metal curtains for such shutters, to increase their reliability and longevity, while at the same time simplifying the fabrication and mode of assembly thereof.

Still another important object of the invention is to improve the combined shutter winding, driving and speed regulating mechanism in such a camera, to increase its dependability and accuracy and to simplify manufacturing and servicing operations associated with that mechanism.

In present cameras adapted to use the above-mentioned size 126 film magazine, the magazine and the lens housing portion of the camera are united by cooperating light sealing members to define the light-tight chamber including not only the exposure area of the film but also an adjacent area, above the exposure area, provided with metering holes to regulate the advancement of the film by cooperation with a metering pawl engaging the film in this area. The provision of such metering means in a camera having a shutter adjacent the lens is relatively simple, inasmuch as the chamber defined by the interior lens housing portion of the camera and that part of the magazine surrounded by the light sealing means remain in total darkness except during exposure of the film. Accordingly, a metering pawl can readily be provided within the area, beyond the exposure area of the film, without admitting light to the sensitized film. However, in adapting such a camera to employ a focal plane shutter, in which case the chamber within the camera behind the objective lens is open to illumination at all times, the film must be isolated from the lens except when it is selectively exposed thereto by the shutter, but the shutter curtain adjacent the film cannot extend across the film metering portion thereof without interferring with the access of the pawl to the film in this area. Therefore, still another object of the invention is to incorporate a focal plane shutter in a camera adapted to use such film magazines, without unduly complicating or interferring with the operation of a film metering pawl employed in cooperation with the metering area of the film strip.

These and other important objects of the invention will be readily apparent from the following detailed description, reference being made to the accompanying drawings in which like reference numerals refer to like elements and in which:

FIG. 2 is an enlarged end view, partly in elevation and partly in cross section, on a somewhat larger scale than FIG. 1, showing the interior construction of the camera along line 2—2 of FIG. 1;

FIG. 3 is a partial top elevation view, greatly enlarged, of several of the cooperating links which comprise the shutter curtains, showing the cooperation of these links with one of the curtain driving gears;

FIG. 4 is a partial top elevation view corresponding in scale to FIG. 3, showing the cooperating portions of the adjacent mating link members of the two curtains in light-tight engagement;

FIG. 5 is a partial front elevation view of the top end portion of the two mating end link members shown in FIG. 4;

Figure 8:
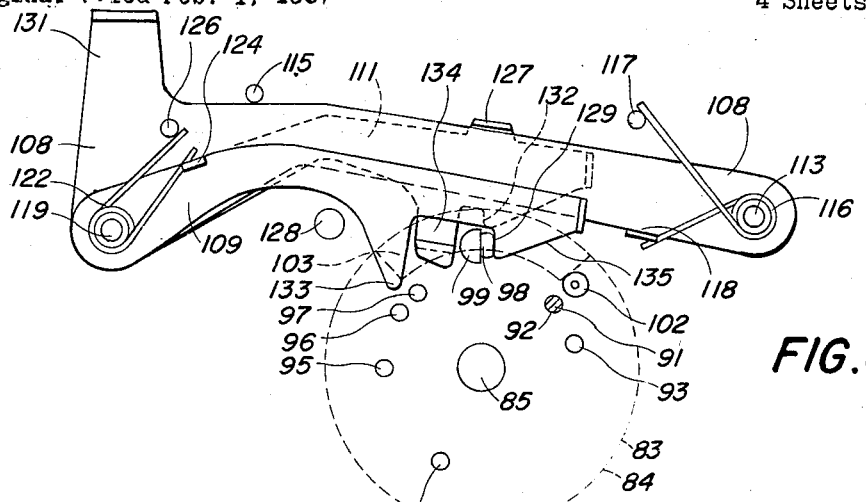
FIG. 8 is a top elevation view to approximately the same scale as FIGS. 2, 6 and 7, showing the cooperation of the shutter actuating levers with the various shutter control pins carried by the schematically illustrated center shutter control gears, when the shutter is in its cocked condition.
Figure 9:
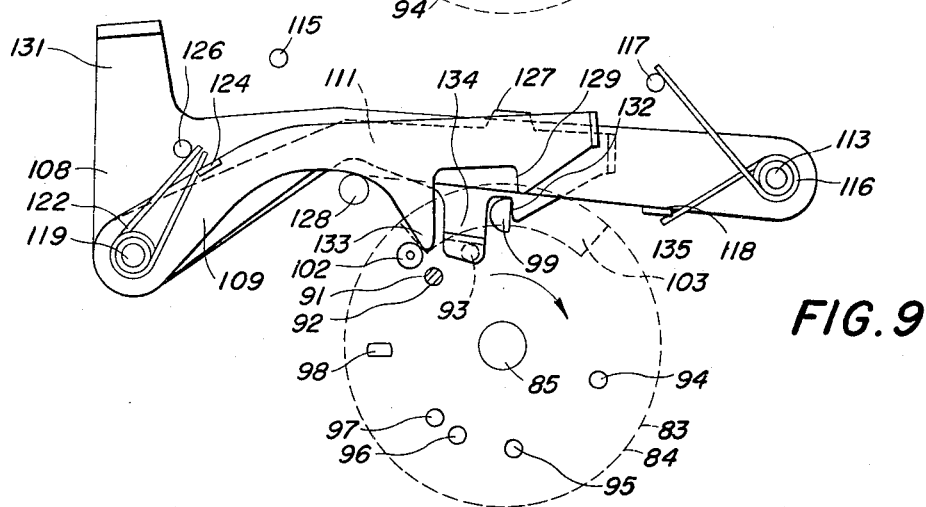
Figure 10:
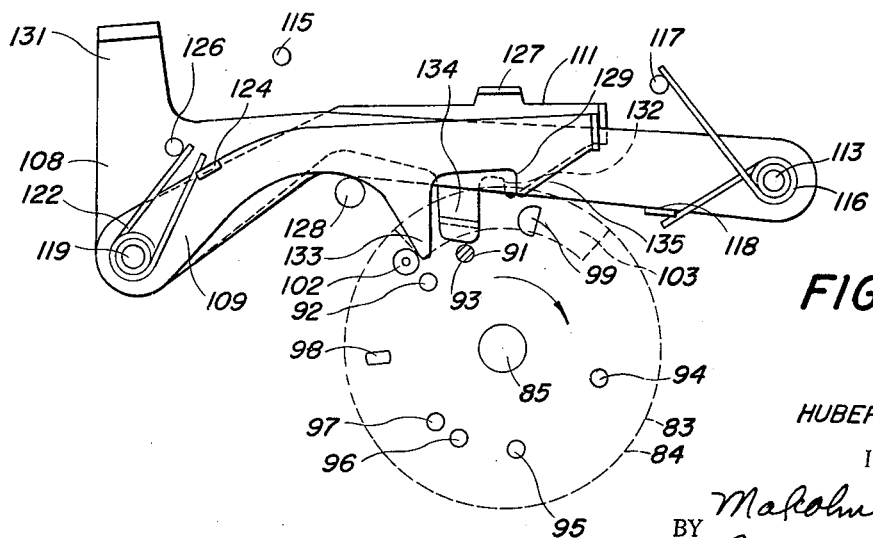

FIG. 9 is a view corresponding to FIG. 8, showing the illustrated elements in the positions assumed thereby following depression of the shutter release lever with the mechanism set for "bulb" exposure; and FIG. 10 is a view corresponding to FIGS. 8 and 9 showing the illustrated elements in the positions assumed thereby at the time of release of the trailing curtain, when the shutter is set to provide a relatively fast exposure.

Figure 1:
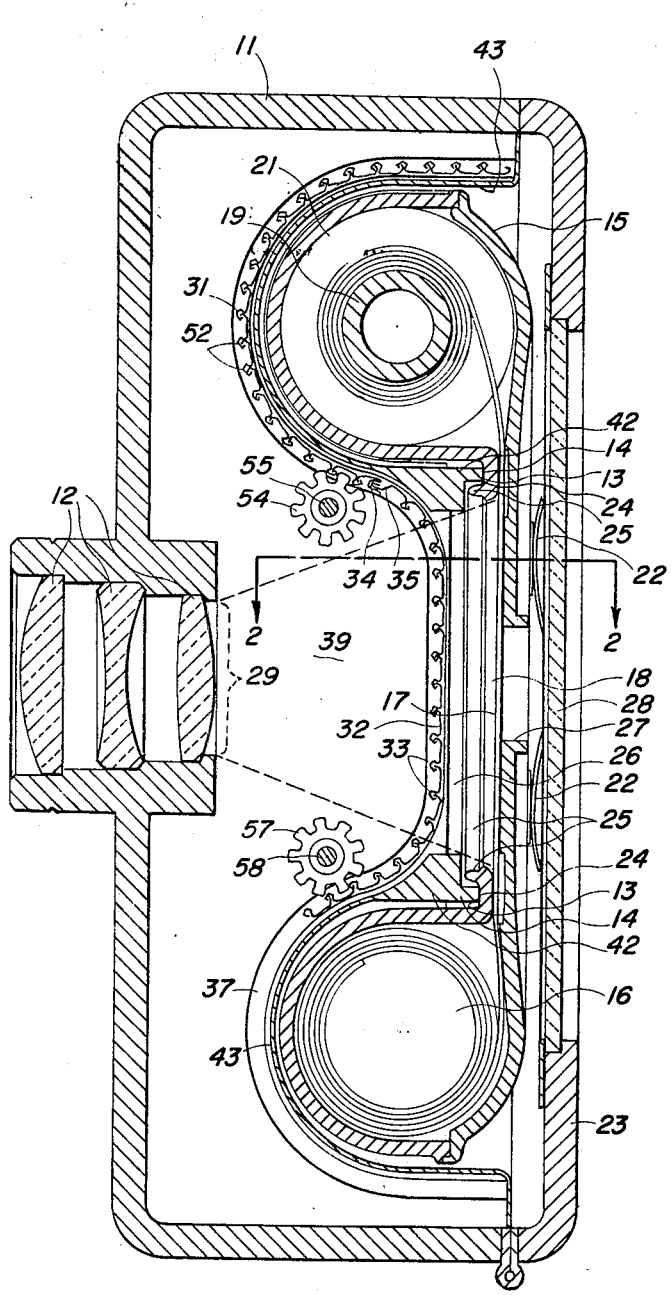
FIG. 1 is an enlarged top sectional view of a loaded magazine type camera according to a preferred embodiment of the present invention, showing the path of the shutter curtains and the location of the curtain driving gears, with the curtains being illustrated in the position which they assume following the completion of an exposure.

Light sealing in general.—Referring now to FIGS. 1 and 2 of the drawings, the illustrated camera comprises an external housing 11 supporting on its front wall an objective lens system 12. A rectangular film magazine support surface 13 is located within the housing 11 in alignment with the lens system along the rearward edge of a generally rectangular rearwardly extending continuous lip 14. The terms "rearwardly" and "forwardly" refer to directions in the camera extending away from or toward objective lens system 12, respectively, in relation to a given reference point. The film magazine 15, which is shown as the particular type of magazine previously referred to, comprises a film supply chamber 16 from which a paper backed film strip 17 extends across a rectangular film aperture 18 and onto a film take-up spool 19 in the film take-up chamber 21. As the film is advanced, the portion thereof in alignment with the exposure aperture is maintained in a flat plane in predetermined relation to the magazine. To locate the exposure area of the film strip at a predetermined fixed distance from the lens support structure of the camera, the magazine is supported against surface 13 by means of spring members 22 on the hinged camera cover 23. Surface 24 of the magazine, which is maintained in supporting abutment with surface 13, is located between an internal continuous forwardly extending ridge 25 and a continuous surrounding surface defined by the adjacent walls of the film chambers and by flanges 26 extending between the chambers. Thus, a light-tight labyrinth is established between the magazine and the continuous lip 14 about the film aperture. The magazine itself is completely light-tight, except at the film aperture 18 and at window 27 in the rear wall thereof. Window 27, however, is covered by the film backing paper, which is provided with indicia visible through the window and through transparent member 28 in cover 23 to indicate the number of exposures that have been made. Accordingly, when the magazine is so positioned in the camera, the only light that can reach the film is that which is admitted through the film aperture of the magazine, aligned with the film exposure area in the focal plane of the lens field, the effective lateral boundaries of which are shown by broken lines 29.

The focal plane shutter includes a flexible leading curtain 31 and a flexible trailing curtain 32, each of which is made up of a plurality of substantially identical interlocking metal link members 33, as will later be described in greater detail, with link members 34 and 35 (FIGS. 1, 4 and 5) at the adjacent ends of the two curtains being configured to provide a light-tight mating joint when the two curtains are in contact with one another.

As best shown in FIGS. 1 and 2, the shutter curtains are supported at their top and bottom edges, respectively, by opposed channels 36 and 37 in intermediate wall member 38 and bottom wall member 39 of the camera housing. As illustrated in FIG. 1, these channels define a path in generally parallel relation to the central portion of the film in the exposure aperture and curving forwardly from the straight central area, with the ends of the path being recurved rearwardly about the film supply and take-up chambers in substantially concentric relation thereto. As will later be explained in detail, the curtains are shown in FIG. 1 in the position which they assume after an exposure has been completed. When the shutter is rewound in preparation for another exposure, the curtains are moved as a single unit to the opposite end of the channels, from which position they are moved independently back to the illustrated position in predetermined timed relation to produce an exposure, as the slit established between their adjacent ends traverses the film in the exposure area.

Side wall members 42 are integral with the vertical portions of lip 14, and with the lower horizontal portion of the lip along bottom wall 39, and adjoin curved wall members, as shown at 43, located between the chamber portions of the magazine and the adjacent curtain channels. By means of this construction, the curtains are protected from exposure to accidental damage when the magazine is removed or installed and light is prevented from entering the interior of the camera housing through transparent member 28 and around the magazine, thereby providing a simplified construction to prevent light leakage between the rearward surface of the curtains and side wall members 42. Light entering the camera through the lens is focused primarily onto the forward surface of the shutter curtain closing the film aperture, but to minimize the possibility of stray light from the lens being reflected around the ends of the curtains and past their rearward surfaces into the film area, or from being internally reflected onto the film when the shutter is open, it may also be desirable to provide thin wall members (not shown) adjacent the sides of the lens field between the front wall of the housing and the curtain path.

Light sealing for metering purposes.—Referring to FIG. 2, intermediate wall member 38 is located below the upper horizontal portion of lip 14, which is integral with support wall 44. Likewise, the upper portions of the adjoining vertical portion of lip 14 extend upwardly beyond intermediate wall 38 and are contiguous with lateral side wall members 45, extending from the magazine support surface to the front wall of the camera housing between intermediate wall member 38 and support wall 44. Accordingly, while the film aperture extends upwardly beyond the shutter curtains, the aperture is nevertheless completely light-tight when the curtains are closed, inasmuch as that portion of the aperture above wall 38 communicates only with a light-tight chamber 46, defined by the front wall of the camera and by the adjoining surfaces of walls 38, 44 and 45. As mentioned earlier, the exposure area behind the film aperture extends approximately up to the lower edge of wall 38, with the portion of the film above that area being devoted to metering purposes. In this upper area, the film may be partially covered by a front guiding member 47, but at least one opening 48 is providing to enable a movable metering pawl 49 to contact the front surface of the film (as shown in broken lines) and to project through the film (as shown in solid lines), when a metering hole 51 is moved into alignment with the pawl. The metering pawl may serve to arrest the movement of the film either by acting directly thereon to overpower a frictional clutch in the film winding mechanism (not shown) or, by being associated with an appropriate device for positively arresting the winding mechanism itself, one appropriate structure for this purpose being shown in U.S. Pat. No. 3,148,605, issued on Sept. 13, 1964. In either case, however, the opening through which the pawl engages the film opens into the light-tight chamber 46, to isolate that opening from the illuminated internal camera chamber behind the lens and from other light sources. The pawl chamber may, of course, be much smaller than the illustrated chamber 46 and may accommodate only a portion of the pawl, so long as the chamber is so configured as to bar the passage of light into the magazine around the movable pawl. In order to withdraw the pawl from metering hole 51, or to operate a metering mechanism in response to movement of the pawl, a linkage member, not shown, can comprise a pivotal shaft or other member associated with the pawl. If such a linkage member passes through a wall member defining the light-tight pawl chamber, appropriate light sealing means can readily be incorporated at that point. From the foregoing, therefore, it is apparent that, when the magazine is installed in the camera as shown, the film is completely isolated from light when the shutter curtains are closed, with light entering the camera through the lens being focused on the film only in the exposure area when the shutter is actuated.

Location of curtain path and curtain drive gears.—To drive the shutter curtains along the curved path defined by channels 36 and 37, the forwardly extending head portions 52 (FIGS. 1 and 3) of the curtain links are engaged in rack and pinion fashion by curtain driving gears 53 (FIG. 6) and 54 (FIGS. 1, 3 and 6) on rotatable shaft 55 adjacent the leading curtain and by curtain driving gears 56 (FIGS. 2 and 6) and 57 (FIGS. 1, 2 and 6) on rotatable shaft 58 adjacent the trailing curtain. Accordingly, as shafts 55 and 58 are rotated by the shutter actuating mechanism, which will be described later, the shutter curtains are correspondingly moved along the curtain path. As is most clearly shown in FIG. 1, the curtain path, unlike that of the previously described prior art shutters, does not define a stragiht line parallel to the entire length of the film exposure area, but begins to curve forwardly within the exposure area adjacent the lateral ends of the exposure area. Also, unlike such prior art cameras, the curtain drive gears are not located in tangential relation to the ends of the straight central portion of the curtain path, with the curtains curving forwardly about the gears. Instead, the gears are disposed forwardly of the central portion of the path and the gear teeth engage the curtains not along the central portion but only at tangent along the curved portions of the path concentric with the film chambers. These important distinctions enable the curtain drive gears and their respective shafts to be located beyond the effective optical field of the objective lens, shown by broken lines 29, without unduly reducing the size of the gears. Additionally, this relation of the gears to the path allows the curved portions of the path adjacent the central area to be of substantially greater radii than the radii of the driving gears, to provide much less restrictive movement of the curtains. Admittedly, the curvature of the curtain path within the field of the camera lens slightly reduces the efficiency of the shutter toward the ends of the exposure area, but this minor sacrifice in efficiency is inconsequential for practical purposes and is far outweighed by the improved shutter performance afforded by the resulting substantially more gradual curvature encountered by the curtains. If space permits the straight central portion of the path to extend the full width of the film aperture without unduly restricting the curvature of the path at the ends of the central portion, the curtain driving gears are nevertheless advantageously located in the above-described forward position, inasmuch as the divergence of the lens field allows the gears to be of greater diameter in such a location without interfering with the image on the film, than might be possible if the gears were adjacent the plane of the central portion of the path.

Shutter curtain structure.—Referring now to the specific construction of the curtains themselves, FIG. 3 shows, in top profile, several of the substantially identical interlocking links or link members 33 in driving engagement with curtain driving gear 54, with the curtain channel 37 depicted in broken lines. Each of the links comprises a generally flat base portion 61 bent forwardly at one side to form a hooklike head portion 52 and at the other side to form a tongue or tongue portion 63. Typically, each of the links is formed of a light strong metal, such as an aluminum alloy, having a thickness of about .0075 inch or less. In spite of the thinness of the metal, however, the links are relatively rigid because of the reinforcing effect of the forwardly bent head and tongue portions extending the full length of each link. Previous flexible metal shutter curtains have likewise comprised a series of interlocking link members, but have employed tubular linking elements adapted to be assembled by sliding axially into one another in concentric relation to provide hinge joints. In the present type curtain, however, each of the tongue portions has a width less than the width of the opening in the head portion and thus is received laterally into the mating head portion, with the resulting curtain being maintained in assembled condition by the curtain guiding channels. This mode of construction, therefore, greatly simplifies assembly operations by enabling the link members simply to be laid together rather than requiring each link member to be axially slid into engagement with the preceding one. Having been so assembled, the curtain links are retained in cooperating relation by appropriate means until the curtain is located in its guide channels, whereupon such means are removed to complete the assembly and installation operations.

With the links assembled as shown in FIG. 3, each of the portions 63 is received at its intermediate bend area 64 between the inner corner 65 of edge 66 and the rounded corner 67 formed by intermediate bend area 68 of the head portion. Accordingly, the contact between the adjacent links occurs substantially along a single line as the curtain is moved in either direction, thereby minimizing friction as the shutter links hinge in relation to one another. It is also important to note that the lines of contact between the adjacent shutter links are located at the middle of the thickest dimension of the curtain. Therefore, the curvature of the curtain path between the curtain driving gears and the film exposure area does not cause any noticeable alteration in the length of the curtains, which could result in a corresponding change in the width of the slit established between the two curtains by the shutter actuating mechanism when an exposure is made. Beyond the corners 65 and 67, the head portions of the links are enlarged to allow free rocking movement of the ends of the tongues received therein and to provide a smoothly curved outer surface 69 for engagement with the curtain driving gears, the contacting tooth surfaces 71 of which are substantially radial to minimize lateral thrust against the curtain.

Link members 34 and 35, at the adjacent ends of the two curtains, have tongue and head portions, respectively, which are identical to those of the other links. The adjacent edges of these two links, however, as shown in partial top elevation in FIG. 4 and in partial front elevation in FIG. 5, cooperate to provide a light-tight seal between the two curtains when they are in abutting engagement. To achieve such light-tight mating engagement, link 35 is provided with a nose portion 72 having at its ends guide lips 73 to preserve the thickness dimension of the link and maintain it centrally in the guide channel. The nose portion 72 is received within a recess 74 defined by the bent edge portion 75 of link 34, which is narrowed as is shown at 76 to clear the adjacent guide lips 73. At the end of the bent edge portion 75, a guide tongue 77 extends forwardly from the link and slightly beyond the guide channel, to guide nose 72 into recess 74 and to provide an additional light barrier. Tongue 77, however, extends only between walls 38 and 39 but not into the channels, as shown by the position of the lower surface of wall 38 illustrated in broken line in FIG. 5 and, therefore, has no effect on the sliding movement of the link in the channels.

Figure 6:
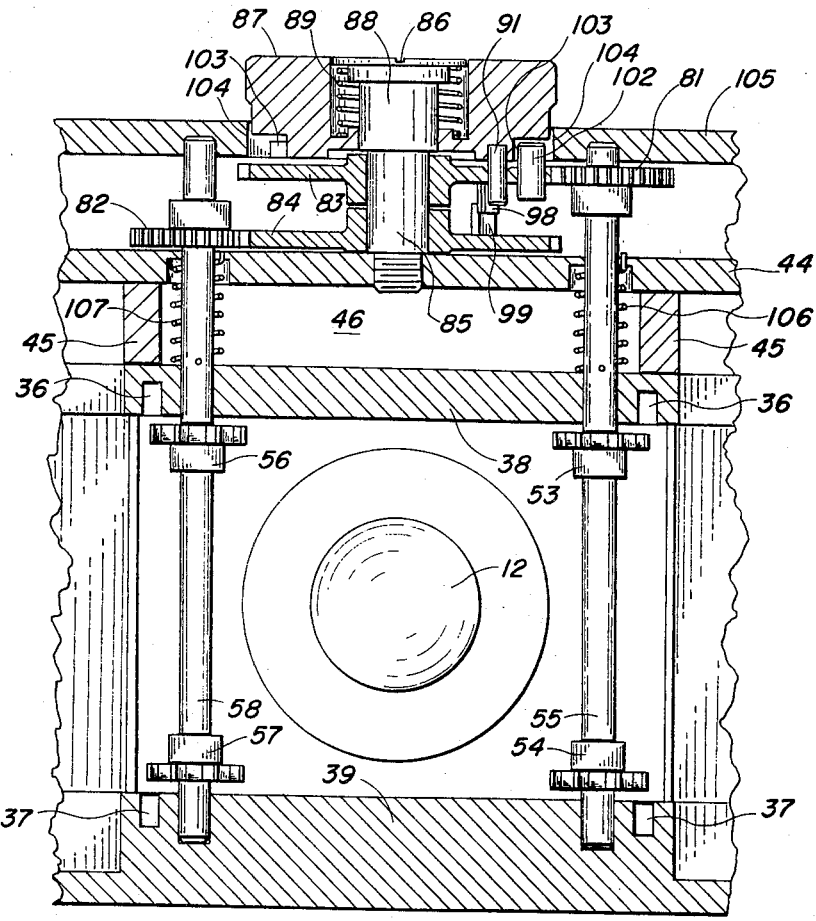
FIG. 6 is a partial rear sectional view, corresponding in scale to FIG. 2, showing the shutter driving assembly and the means for adjusting shutter speeds with the shutter actuating levers omitted for purposes of clarity.

Curtain drive gear mechanism.—The curtain drive mechism is illustrated by FIGS. 6 through 10. Referring to FIG. 6, the two rotatable shafts 55 and 58, carrying the curtain driving gears, 53, 54, 56 and 57 are provided at their upper ends, respectively, with pinion gears 81 and 82, which mesh, respectively, with center gears 83 and 84 mounted for independent rotation on shank 85 of bolt 86 supported on support wall 44. These gears constitute the entire gear train required to drive the shutter curtains, and it should be noted that the coaxial center gears mesh directly with the pinions on the curtain driving gear shafts, thus eliminating intermediate idler gears. This simple construction is made possible only by the previously described disposition of the curtain drive gear shafts, in relatively close relation to one another, at opposite sides of the optical field of the lens, whereby the coaxial center gears can mesh directly with the smaller pinions without requiring the center gears to be so large as to dictate enlargement of the camera housing. Likewise, by minimizing the size and number of rotatable gears and shafts in the gear train, the inertia of the shutter drive system, is also minimized. The center gears must necessarily be larger than the pinions on the curtain driving gear shafts to enable the curtain driving gears to effect the required movement of the curtains as the center gears rotate through somewhat less than a single revolution, but, nevertheless, the illustrated construction enables the center gears to be of a relatively small diameter less than the width of the exposure aperture.

A knob 87 is rotatably supported on shank 88 of bolt 86 and is vertically movable against the influence of spring 89. A pin 91 (FIGS. 6, 8, 9 and 10) is attached to the lower surface of knob 87, which can be raised, turned and lowered to insert pin 91 into any one of a plurality of holes 92, 93, 94, 95, 96 and 97, corresponding to different shutter speed settings, In the illustrated embodiment, hole 92 corresponds to the "bulb" setting, in which the shutter remains open as long as the shutter trigger is depressed, with holes 93 through 97 corresponding respectively to increasingly faster shutter speeds, e.g. $\frac{1}{30}$, $\frac{1}{60}$, $\frac{1}{125}$, $\frac{1}{250}$ and $\frac{1}{500}$ of a second. Additionally, upper center gear 83 carries a fixed depending pin 98, which is in lateral abutting contact with upwardly extending pin 99 on lower center gear 84 whenever the shutter is cocked or is at rest after an exposure has been completed.

In FIG. 6, the center gears and their above-mentioned pins are shown in an arbitrarily selected intermediate position for purposes of illustration. FIGS. 8, 9 and 10 illustrate the actual relative positions of the pins and the holes in the center gears, the coaxial peripheries of which are schematically illustrated by a circular broken line. In FIG. 8, the mechanism is shown in the cocked position in which the curtains are in light-tight mating relation to one another at the left end of the curtain path as shown in FIG. 1, with pin 91 inserted into the "bulb" timing hole in center gear 83. In FIG. 9, the various components are likewise shown with the shutter set for "bulb" operation, with the components in the position assumed after the leading curtain has completed its movement but before the trailing curtain has been released. In FIG. 10, the components are shown with pin 91 in hole 93, corresponding to a shutter speed of $\frac{1}{30}$ of a second, immediately following the release of the trailing curtain but before completion of its movement.

When the shutter is in its unwound condition after completion of an exposure, each center gear is in its extreme clockwise position, as viewed from the top, with further clockwise movement of gear 83 being prevented by the abutment of stop pin 102 thereon against the left edge of stop member 103, which projects into a circular opening 104 in the top wall 105 (see FIGS. 6 and 7) of the camera housing beneath knob 87. Likewise, center gear 84 is blocked against further clockwise rotation by the engagement of its pin 99 with pin 98 on the upper gear 83. In this condition, the meshing relation of the center gears with pinions 81 and 82 is such that the curtains have assumed the position shown in FIG. 1.

To wind and cock the shutter actuating mechanism from the rest position just described, knob 87 is rotated in a counterclockwise direction, as viewed from the top. Because of the engagement of pin 91 with gear 83, that gear is thereby rotated, and drives shaft 55 through pinion 81 to move the leading shutter curtain 31 to the left. Such rotation of shaft 55 also serves to wind the leading curtain driving spring 106, attached at one end to shaft 55 and at its opposite end to support wall 44. Simultaneously, pin 98, in contact with pin 99 on lower gear 84, causes that gear to rotate shaft 58 to wind spring 107 similarly attached thereto and to move the trailing curtain 32 in light-tight mating engagement with the leading curtain 31. When the two mating curtains have reached their extreme left position, shown in FIG. 1, further counterclockwise rotation of knob 87 is prevented by the engagement of stop pin 102 with the right edge of stop member 103 as shown in FIG. 8.

Figure 7:
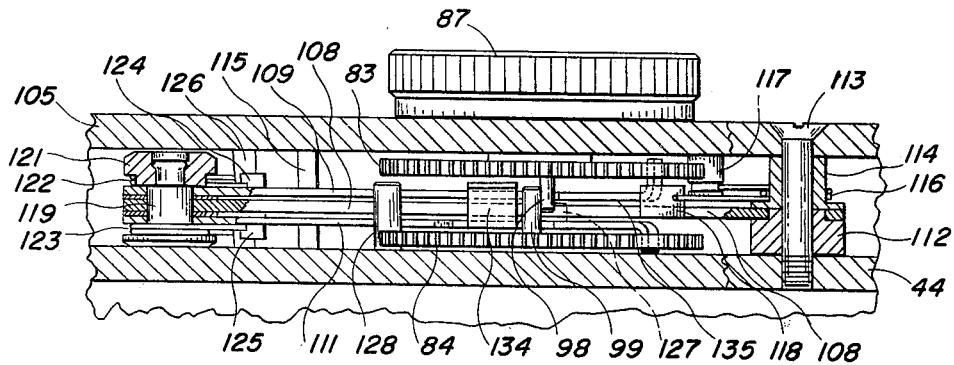
FIG. 7 is a partial rear view, partly in section and partly in elevation, corresponding to FIG. 6 and showing the shutter actuating levers in cooperation with the center shutter control gears, with the pinion gears and the hub portions of the center gears omitted for purposes of clarity.

Shutter release mechanism.—The shutter release mechanism, which holds gears 83 and 84 in their cocked position against the clockwise rotative influence exerted thereon by springs 106 and 107, and which sequentially releases the gears to drive the shutter curtains, comprises a shutter release lever 108, and upper pawl lever 109 and a lower pawl lever 111. As seen in FIG. 7, levers 109, 111 and 108 are disposed in parallel relation to gears 83 and 84 in lateral alignment with the pins thereon. Viewed from the top, release lever 108 is pivotally supported at its right end on a bushing 112 affixed to support wall 44 by a screw 113 passing through the bushing and through a hub member 114. The release lever is urged in a clockwise direction against stationary stop pin 115 by a spring 116, wound about the hub member with the ends thereof in engagement with stationary pin 117 and lip 118 on the lever. The upper and lower pawl levers 109 and 111 are located, respectively, above and below the release lever, and are pivotally attached thereto by a rivet 119 extending through the release lever and through an upper hub member 121. As shown in FIG. 7, the ends of rivet 119 are closely adjacent wall members 44 and 105 to movably support the corresponding ends of the levers, with the opposite ends of pawl levers 109 and 111 being provided with bent end portions similarly engaging the same wall surfaces. Springs 122 and 123, extending around rivet 119, are installed between lips 124 and 125 on pawl levers 109 and 111, respectively, and a pin 126 extending through the release lever, to bias the pawl levers in a clockwise direction relative thereto. The clockwise movement of the lower pawl lever is limited by engagment of ear 127 thereon with the forward edge of the release lever, with the clockwise movement of the upper pawl lever being limited by its engagement with a stationary stop pin 128 on support wall 44.

With the center gear in the wound position previously described, as shown in FIG. 8, pin 98 on gear 83 is trapped by shoulder 129 on upper pawl lever 109 to prevent clockwise movement of gear 83 by spring 106. Likewise, clockwise movement of gear 84 by spring 107 is prevented through the engagement of pin 99 thereon with trapped pin 98 on gear 83. When the release lever 108 is rotated in a counterclockwise direction by manual rearward depression of trigger extension 131, the upper pawl member engages pin 128 and is rocked out of engagement with pin 98 to release gear 83. Simultaneously, however, the lower pawl lever moves with the release lever to bring shoulder 132 thereon into trapping engagement with pin 99 on gear 84. Thus, the upper center gear is released and begins its clockwise rotation, allowing the leading shutter curtain to move to start the exposure, while the lower gear 84 remains temporarily blocked, thereby preventing movement of the trailing curtain.

FIG. 9 shows the end of the first phase of a "bulb" exposure, in which rotation of center gear 83 has been stopped by the abutment of pin 102 against the left edge of stop member 103, at which time the trailing edge of the leading curtain has cleared the film aperture, leaving the aperture entirely open. Closing the shutter to complete the "bulb" exposure is accomplished by releasing trigger extension 131, which allows shutter release lever 108 to return to its initial position, thereby moving lower lever 111 forwardly to withdraw shoulder 132 thereof from trapping engagement with pin 99. During such forward movement of lever 108, upper lever 109 is temporarily blocked from returning to the position shown in FIG. 1 by the engagement of a noselike projection 133 thereon with stop pin 102 abutting against stop member 103. When pin 99 is thus released, gear 84 is rotated a clockwise direction by spring 107 and the trailing curtain is moved across the film aperture into mating engagement with the leading curtain, at which time gear 84 has rotated sufficiently to bring pin 99 thereon into blocked engagement with pin 98 on gear 83.

To provide for "time" exposure, rather than "bulb" exposure, noselike, projection 133 may simply be eliminated from upper lever 109, and pin 99 lengthened, thus allowing lever 109 to return to the position shown in FIG. 8 when the trigger is released. With lever 109 so modified, the movement of shoulder 132 on lever 111 out of engagement with pin 99 is accompanied by the movement of shoulder 129 on lever 109 into the path of the pin, to maintain gear 84 in blocked condition. When the trigger extension is again depressed, lever 109 is rocked out of engagement with pin 99 by stationary pin 128, to allow gear 84 to rotate in a clockwise direction, as previously described, to complete the exposure.

FIG. 10 shows the shuter closing action when pin 91, rather than being in the "bulb" setting hole 92, has been inserted into hole 93, corresponding for illustrative purposes to a speed setting of 1/30 of a second. After gear 83 has been released, and the leading curtain has moved a pre-determined distance, but before the movement of gear 83 has been arrested by the abutment of stop pin 102 against stop member 103, pin 91 strikes the rearward edge of projection 134 on lower pawl lever 111 and moves the lever to disengage shoulder 132 from pin 99. As soon as pin 99 has been released, the trailing curtain moves across the film aperture and into mating engagement with the leading curtain, with pin 99 coming into abutting relation with pin 98, thereby arresting further movement of the gears and curtains.

It is apparent from FIG. 8 that if pin 91 is located in a hole corresponding to a faster speed, such as in hole 97 corresponding to 1/500 of a second, the pin will strike projection 134 almost immediately after gear 83 has been released to initiate movement of the leading curtain. Accordingly, the trailing curtain will pass across the film aperture in closely spaced relation to the adjacent edge of the leading curtain, with the width of the slit so established and the speed of movement of the curtains as determined by springs 106 and 107 being such as to provide an effective shutter speed of 1/500 of a second. Intermediate shutter speeds are achieved in the same manner, by inserting pin 91 in one of the other speed setting holes in gear 83, whereby the leading curtain moves through a distance proportionate to the desired exposure duration before the corresponding angular movement of gear 83 causes pin 91 to effect the release of the trailing curtain, thus providing a proportionately wider slit between the curtains as they traverse the film aperture.

Upon completition of the exposure, regardless of the speed setting employed, the gears and curtains assume the respective positions previously described. As was also explained earlier, the shutter is subsequently rewound by rotating knob 87 in a counterclockwise direction to move the center gears back into the position shown in FIG. 8, during which movement cam surface 135 on lever 109 is engaged by pins 99 and 98 to displace the lever, allowing pin 98 to move into the illustrated cocked position, in which it is again engaged by shoulder 129.

The foregoing description has referred to a particular preferred embodiment of the subject camera and focal plane shuter, but it will be apparent that numerous variations and modifications can be effected within the spirit of the invention. Merely by way of example, while springs 106 and 107 are shown and described as being concentric with shafts 55 and 58 and attached to support wall 44, these springs might readily be relocated and/or be a different configuration, and means might be provided, perhaps in association with an automatic exposure control device for varying the tension of the springs to regulate the exposure duration both as a function of the width of the curtain slit and also of the speed with which such slit traverses the film aperture. Similarly, although two curtain driving gears are illustrated on each of the shafts 55 and 58, in engagement with the end portions of the curtain links, a single wide gear might be employed on each shaft to engage the curtain along a major portion of its span, or more than two gears could be used to provide greater contact area and support. Additionally, the illustrated embodiment contemplates a camera with a removable magazine, but many features of the invention are equally appropriate to other than magazine loaded cameras. Furthermore, it is apparent that other camera mechanisms may be combined with the disclosed structure, for example, to advance the film in response to the shutter winding operation. Accordingly, the invention is not to be limited to the specific details shown and described, but is of a scope as defined by the appended clams.

What is claimed is:

1. A focal plane shutter apparatus for a camera, said camera having a planar exposure area with lateral ends and a central portion, an objective spaced from the plane of the exposure area to focus an image onto the exposure area, said objective having a field defined as that space between the objective and the exposure area through which light passes from the objective to impinge upon the exposure area, a film receiving chamber adjacent each lateral end of said exposure area, and means for advancing film from one of the chambers past the exposure area to the other chamber, said focal plane shutter apparatus comprising:
 (a) means for guiding a shutter curtain through a path, said path having:
  (1) a middle portion lying in a plane parallel to and adjacent the plane of the exposure area along the central portion of the exposure area,
  (2) intermediate portions on either lateral side of and adjacent to said middle portion away from the plane of the exposure area with at least part of each of said intermediate portions located within the objective field, and
  (3) end portions curved at least partially back toward the plane of the exposure area about said receiving chambers between said objective and said chambers;

(b) flexible shutter curtain means having opposite edges supported in said guiding means for sliding movement laterally across the exposure area along said path;

(c) curtain driving gear means adjacent said path and the objective field, said gear means being located entirely between said plane of the middle portion of said curtain path and the objective; and (d) surface means on said curtain means engageable by said gear means at a point of tangency on either one of said intermediate portions or one of said end portions to translate rotational movement of said gear means into sliding movement of said curtain means along said path.

2. A focal plane shutter apparatus for a camera, said camera having a planar exposure area with lateral ends and a central portion, an objective spaced from the plane of the exposure area to focus an image onto the exposure area, said objective having a field defined as that space between the objective and the exposure area through which light passes from the objective to impinge upon the exposure area, a film receiving chamber adjacent each lateral end of said exposure area and means for advancing film from one of the chambers past the exposure area to the other chamber, said focal plane shutter apparatus comprising:

(a) means for guiding a shutter curtain through a path, said path having:
(1) a middle portion lying in a plane parallel to and adjacent the plane of the exposure area along the central portion of the exposure area,
(2) intermediate portions on either lateral side of and adjacent to said middle portion and curved out of the plane of said middle portion away from the plane of the exposure area with at least part of each of said intermediate portions located within the objective field, and
(3) end portions curved at least partially back toward the plane of the exposure area about said receiving chambers between said objective and said chambers;

(b) a pair of flexible curtains having opposite edges supported in said guiding means for sliding movement laterally across the exposure area in a predetermined spaced tandem relation along said path; and (c) curtain driving means comprising:
(1) at least two rotatable curtain driving gears adjacent said path at opposite sides of the objective field, each gear being located entirely between said plane of the middle portion of said path and the objective,
(2) surface means on each of said curtains engageable by one of said curtain driving gears at a point of tangency on either one of said intermediate portions or one of said end portions to translate rotational movement of said gears into sliding movement of said curtains along said path, and
(3) power means for rotating said curtain driving gears to move said curtains along said path.

3. A focal plane shutter apparatus as defined in claim 2 wherein said curtain driving gears are located outside the objective field.

4. An apparatus according to claim 2 in which each of said curtain driving gears engages said curtains along the end portions of said path.

5. An apparatus according to claim 2 in which the largest radius of said curtain driving gears is substantially smaller than the smallest radius of curvature of said path at any point therealong.

6. An apparatus according to claim 2 in which said flexible curtains comprise a plurality of similar interlocking metal link members, said surface means comprising a head member on each of said link members extending toward said driving gears and providing for engagement of said curtains by said curtain driving gears in rack and pinion fashion.

7. An apparatus according to claim 2 in which said film-receiving chambers comprise a unitary film magazine removable from said camera.

8. An apparatus according to claim 7 wherein each of said center gears has a diameter less than the lateral length of said exposure area.

9. A camera adapted to receive a film magazine of the type having a housing, an opening in the housing aligned with adjacent exposure and metering areas of a filmstrip within the magazine, and a recess in the housing around the opening, said camera comprising:

(a) a camera housing;
(b) a lens in said camera housing, said lens being spaced from the exposure area of the film and defining with the exposure area an optical space therebetween when the magazine is received in said camera;
(c) second wall means adjacent the metering area of the film and abutting said first wall means to define a metering opening;
(d) a metering pawl extending through said metering hole toward the metering area of the film;
(e) light sealing means associated with said second wall means for precluding passage of light through said metering hole around said pawl when said magazine is in the camera;
(f) a focal plane shutter curtain movable into and out of a closed position across the opening in the film magazine, said curtain when in a closed position providing a light-tight barrier between the film in the exposure area and said lens; and
(g) a continuous lip integral with said first wall means and received in light-tight relation within said recess when the magazine is in the camera, said lip providing a light-tight barrier about the opening between said magazine and said first wall means, whereby said film in the magazine is isolated from light except when said curtain is in other than said closed position.

10. A focal plane shutter apparatus for a camera, said camera having a planar exposure are with lateral ends and a central portion, an objective spaced from the plane of the exposure area to focus an image onto the exposure area, said objective having a field defined as that space between the objective and the exposure area through which light passes from the objective to impinge upon the exposure area, a film receiving chamber adjacent each lateral end of said exposure area and means for advancing film from one of the chambers past the exposure area to the other chamber, said focal plane shutter apparatus comprising:

(a) means for guiding a shutter curtain through a path, said path having:
(1) a middle portion lying in a plane parallel to and adjacent the plane of the exposure area along the central portion of the exposure area,
(2) intermediate portions on either lateral side of and adjacent to said middle portion and curved out of the plane of said middle portion away from the plane of the exposure area with at least part of each of said intermediate portions located within the objective field, and
(3) end portions curved at least partially back toward the plane of the exposure area about said receiving chambers between said objective and said chambers;

(b) a pair of flexible curtains having opposite edges supported in said guiding means for sliding movement laterally across the exposure area in a predetermined spaced tandem relation along said path; and (c) curtain driving means comprising:
(1) at least two rotatable curtain driving gears adjacent said path at opposite sides of the objective field, each gear being located entirely between said plane of the middle portion of said path and the objective,
(2) surface means on each of said curtains engageable by one of said curtain driving gears at a point of tangency on either one of said intermediate portions or one of said end portions to translate rotational movement of said gears into sliding movement of said curtains along said path,
(3) power means for rotating said curtain driving gears to move said curtains along said path,
(4) first and second rotatable shafts supporting the driving gears associated with the leading and trailing curtains, respectively,
(5) first and second pinions carried by said first and second shafts, respectively,
(6) first and second coaxial center gears extending between the axes of said shafts and in direct meshing engagement with said first and second pinions, respectively,
(7) resilient means for rotatively urging said shafts in the same direction,
(8) first and second latching means associated with said first and second center gears, respectively, to block rotation of the shaft associated therewith by said resilient means, and
(9) means for releasing said first and second latching means for said center gears in predetermined timed sequence to produce correspondingly timed sequential movement of said curtains.

11. A focal plane shutter apparatus for a camera, said camera having a planar exposure area with lateral ends and a central portion, an objective spaced from the plane of the exposure area to focus an image onto the exposure area, said objective having a field defined as that space between the objective and the exposure area through which light passes from the objective to impinge upon the exposure area, a film receiving chamber adjacent each lateral end of said exposure area forming a unitary film magazine which is removable from said camera, and means for advancing film from one of the chambers past the exposure area to the other chamber, said focal plane shutter apparatus comprising:
(a) means for guiding a shutter curtain through a path, said path having:
(1) a middle portion lying in a plane parallel to and adjacent the plane of the exposure area along the central portion of the exposure area,
(2) intermediate portions on either lateral side of and adjacent to said middle portion and curved out of the plane of said middle portion away from the plane of the exposure area with at least part of each of said intermediate portions located within the objective field, and
(3) end portions curved at least partially back toward the plane of the exposure area about said receiving chambers between said objective and said chambers;
(b) a pair of flexible curtains having opposite edges supported in said guiding means for sliding movement laterally across the exposure area in a predetermined spaced tandem relation along said path; and
(c) curtain driving means comprising:
(1) at least two rotatable curtain driving gears adjacent said path at opposite sides of the objective field, each gear being located entirely between said plane of the middle portion of said path and the objective,
(2) surface means on each of said curtains engageable by one of said curtain driving gears at a point of tangency on either one of said intermediate portions or one of said end portions to translate rotational movement of said gears into sliding movement of said curtains along said path,
(3) power means for rotating said curtain driving gears to move said curtains along said path,
(4) first and second pins on said first and second center gears, respectively,
(5) a shutter release lever pivotally mounted at one end to said camera and provided at its other end with a manually accessible trigger member,
(6) a first pawl lever pivotally supported on said shutter release lever in substantially parallel relation thereto and including a first shoulder surface movable between said center gears to releasably engage said first pin to arrest movement of said leading curtain by said resilient means, and
(7) a second pawl lever pivotally supported on said shutter release lever in substantially parallel relation thereto and including a second shoulder surface movable between said center gears to releasably engage said second pin to arrest movement of said trailing curtain by said resilient means.

References Cited

UNITED STATES PATENTS

| | | | |
|---|---|---|---|
| 2,149,094 | 2/1939 | Kuppenbender | 95—57 |
| 3,138,084 | 6/1964 | Harvey | 95—31 |

FOREIGN PATENTS

| | | |
|---|---|---|
| 561,859 | 10/1932 | Germany. |
| 566,191 | 12/1932 | Germany. |
| 832,849 | 2/1952 | Germany. |

NORTON ANSHER, Primary Examiner

L. H. McCORMICK, Jr., Assistant Examiner